United States Patent Office 2,881,223
Patented Apr. 7, 1959

2,881,223
BICYCLIC COMPOUNDS CONTAINING NUCLEARLY SUBSTITUTED HALOGEN

Louis Schmerling, Riverside, Ill., assignor to Universal Oil Products Company, Des Plaines, Ill., a corporation of Delaware No Drawing. Application June 17, 1954
Serial No. 437,591

5 Claims. (Cl. 260—648)

This application is a continuation-in-part of my copending application Serial No. 100,755 filed June 22, 1949, now abandoned.

This invention relates to novel cyclic organic compounds containing halogen substituents in their structure which are useful as chemical intermediates and as insect toxicants in insecticidal formulations. More specifically, the invention concerns halogen-containing cyclic compounds formed by a particular process involving the controlled condensation of a hexahalocyclopentadiene with an aliphatic olefinic hydrocarbon, to insecticidal compositions containing said compounds and to the use of such compositions for insecticidal purposes.

This invention provides a series of compounds characterized generally as bicyclic compounds substituted on multiple nuclear positions by halogen atoms. The present bicyclic compounds are formed by the condensation of a hexahalocyclopentadiene with an aliphatic mono-olefin, the product of such condensation being represented structurally by the empirical formula:

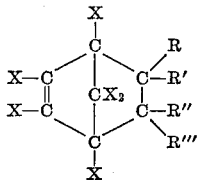

wherein R, R', R" and R'" are selected from the group consisting of hydrogen and alkyl groups and X is a halogen atom selected from chlorine and bromine.

The production of the present bicyclic, halogen-containing compounds is effected by the controlled thermal condensation of the hexahalocyclopentadiene reactant with the mono-olefinic hydrocarbon reactant at a pressure preferably sufficient to maintain at least one of the reactants in substantially liquid phase. Although an approximately equimolar ratio of the reactants may generally be utilized in the process to effect an almost quantitative conversion to the desired condensation product, it is preferred to maintain the proportion of the olefinic hydrocarbon component in the reaction mixture at a somewhat higher than equimolecular ratio thereof, from about 1.5 to 1 to about 10 to 1 in order to consume the hexahalocyclopentadiene component substantially to completion during the reaction. The excess of the mono-olefinic hydrocarbon reactant provides an effective diluent of the reaction mixture, enabling the rate of the resulting exothermic reaction to be controlled within the desired limits. In thus substantially removing the hexahalocyclopentadiene component from the reaction mixture by virtue of its condensation with the olefinic hydrocarbon reactant, the subsequent problem of separating the product from the reaction mixture is simplified, since the excess of mono-olefin, usually the most volatile component of the reaction mixture, may be recovered therefrom by merely distilling the same from the mixture, leaving a residue consisting predominantly of the product. The latter residue may thereafter be further purified, for example, by recrystallization, extraction or by other means well known to the art or utilized directly without further treatment for the preparation of an insecticidal composition.

The condensation reaction provided herein is effected at a temperature of from about 100° to about 250° C., preferably at a temperature of from about 150° to about 200° C., and at atmospheric or at a superatmospheric pressure, superatmospheric pressures up to about 100 atmospheres are particularly useful when a relatively volatile, low molecular weight olefinic hydrocarbon is utilized in the condensation reaction. In conducting the reaction, it is desirable that the rate of applying heat to the reaction mixture be rigidly controlled, particularly when ethylene is employed as the mono-olefin reactant. Observations have shown that the rate of increasing the temperature of the reaction mixture comprising ethylene as the mono-olefin reactant, in the generally critical temperature range of from about 120° to about 200° C., during which the condensation reaction proceeds exothermally, must be maintained at from about 0.1 to about 2.0 degrees per minute, and preferably at a rate of from about 0.3 to about 0.7 degree per minute. Higher rates of heating may be employed, however, if a means of efficiently removing the exothermic heat of reaction is provided.

It is often beneficial to use an inert diluent, for example, an aromatic or a paraffinic hydrocarbon, such as toluene or octane, for the mixture of hexahalocyclopentadiene and olefin. Further, the reaction may be carried out in the presence of an alkaline substance, for example, anhydrous potassium carbonate, in order to substantially prevent side reactions which are accompanied by the elimination of hydrogen chloride.

Although hexachlorocyclopentadiene is preferred in the present process as the dienic reactant because of its availability in commercial quantities and because of the highly effective insecticidal properties of its condensation products with mono-olefinic hydrocarbons, hexabromocyclopentadiene or a hexahalocyclopentadiene in which the halogen substituents are mixed chlorine and bromine may likewise be utilized in the reaction to provide bromine-containing polycyclic compounds having molecular structures similar to the condensation products of the corresponding hexachlorocyclopentadiene reactant. Thus, for example, 1,1,4-tribromo-2,3,5-trichlorocyclopentadiene, 1,1,4-trichloro-2,3,5-tribromocyclopentadiene and 2,3,4,5-tetrachloro-1,1-dibromocyclopentadiene are illustrative of merely some of the mixed hexahalocyclopentadienes utilizable herein.

Mono-olefinic hydrocarbons which condense with the hexahalocyclopentadiene reactant to form the present condensation products may be selected from the aliphatic mono-olefins containing at least 2 carbon atoms per molecule, the molecular weight of the mono-olefin in general determining the volatility of the resulting condensation product and the suitability of the product for specific uses. Thus, ethylene may be preferred as the mono-olefin reactant when a product possessing maximum volatility is desired as the ultimate product, other typical representative olefins including, for example, propylene, 1-butene, 2-butene, isobutylene, 1-pentene, 2-pentene, 2-methyl-1-butene, 2-methyl-2-butene, 1-hexene and other m-hexylenes, 2-methyl-1-pentene, 3-methyl-1-pentene, 3-methyl-2-pentene, 3-methyl-3-pentene, 2,3-dimethyl-1-butene, the octene isomers, the decene isomers, dodecylenes, pentadecylenes, octadecylenes, etc. The mono-olefinic reactant may consist of a single individual isomer, or a mixture of isomers or homologs of either straight or branched chain structures or a mixture of double bond position isomers, as desired. A typical mixture of position isomers and branched chain isomers is represented for example by the mixture formed by polymerization of propylene, containing many double bond position isomers as well as one or more structural isomers. Included among the aliphatic mono-olefins utilizable in the present process are the cycloalkyl-substituted alkenes; that is, alkenes in which one or more hydrogen atoms are substituted by a cycloalkyl radical. For purposes of characterizing the mono-olefin reactant herein, such cycloalkyl substituted alkenes are specifically included within the class of aliphatic olefins contemplated in this invention. Thus, typical specific olefins of the latter type include, for example, 3-cyclohexyl-1-butene, 4-cyclohexyl-1-pentene, and others, preferably olefins in which the cycloalkyl group is substituted on a carbon atom other than one of the pair of doubly bonded carbon atoms.

The physical properties of the present condensation products and the effects they have on entomological forms of life make them particularly desirable as insecticides and insect repellants. The combination of properties the present products exhibit indicate their applicability as insecticides in that they provide many of the properties desired of compounds for this purpose. They are, for example, highly toxic to insects which are destructive of plant life and property normally subject to insect infestation, their toxic effects being manifested by contact of the poison with the insect. The insecticides comprising the present compounds are thus effective against chewing as well as sucking types of insects. The compounds are sufficiently volatile such that when applied to plant life intended for subsequent human consumption, the plant when harvested and after allowing a reasonable time for evaporation of the applied compounds therefrom retain none of the insecticide to prevent use of the plant for food purposes. On the other hand, the compounds are of sufficiently limited volatility to be retained on the insect for the time required to accomplish the toxic effect of the compounds. The volatility and retentive capacity of the compounds may be varied at will by combining them with suitable fixing agents which reduce or promote their volatilization, as desired. Thus, the compounds may be dissolved in a suitable solvent having a high boiling point, such as a mineral or vegetable oil, petrolatum, etc. a wax, such as paraffin wax, beeswax, etc., a high molecular weight alcohol or ether such as myricyl alcohol, dibutyl ether, etc. or they may be emulsified with water or combined with an oil and emulsified with water by the addition of an emulsifying agent such as a surface active agent to a mixture of the components. The latter solvents and dispersants may also be employed for the specific purpose of reducing the concentration of insecticide to a desirable formulation. The compounds, for example, may be formulated into compositions containing the active component in a concentration sufficient to take advantage of its maximum efficacy, which at certain optimum concentrations has the desired toxic effect. The particular formulation of active components in combination with the solvent or dispersant desired for any particular purpose will depend upon its application. Compositions containing as high as 20% of active component may be preferred in some instances where deep penetration of the insecticide is desired, as in the treatment of fibrous material, such as wood for extinction of a particular infestation, such as wood termites. For other purposes, the required concentration of active components in the formulation may be as low as about 0.1%, as for example, in the treatment of fabrics for destroying moth larvae. In general, in utilizing the present insecticidal compounds against most insects, compositions containing from about 1% to about 5% by weight of the active component is highly effective. The choice of the most suitable solvent or dispersant further depends upon the method utilized to apply the composition to the infested article. For example, a low molecular weight, normally gaseous carrying agent for the active component, such as butane, freon, etc. may be compressed and liquefied into a small bomb containing the insecticidal compound. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, etc. and the resultant solution atomized by a suitable spraying device.

The insecticidal properties of the compounds of the present invention may be modified by subjecting them to further reaction such as nitration, hydrogenation, hydroxylation, hydrohalogenation (particularly, hydrochlorination) halogenation (particularly chlorination), etc.

Although primarily useful as insecticides, the products of this invention also find specific use as fungicides and for other pesticidal uses, as well as intermediates in the synthesis of other compounds.

This invention is further described with reference to the following illustrative examples which, although indicative of typical representative compounds of the present process are nevertheless not intended to limit the generally broad scope of the invention in strict accordance therewith.

Example 1

1,2,3,4,7,7-hexachlorobicyclo(2.2.1) - 2 - heptene was prepared by the condensation of hexachlorocyclopentadiene with ethylene in the following series of experiments which were conducted to determine the optimum reaction conditions required to effect the condensation, and particularly the heating rate factor.

200 grams of hexachlorocyclopentadiene was charged into a glass-lined pressure autoclave with ethylene at 50 atmospheres pressure and heated from room temperature (30° C.) at the rate of 3.4° per minute to a temperature of 200° C. at which final temperature it was maintained for a period of six hours. The final pressure at the end of the above period was 90 atmospheres and upon releasing the pressure and opening the autoclave, the product was found to be predominantly porous carbon mixed with a very small amount of fine, needle-shaped, white crystals having the empirical formula $C_1Cl_1$.

In a second experiment to determine a suitable heating rate for the condensation reaction, 200 grams of hexachlorocyclopentadiene was charged into a pressure autoclave containing a glass-liner and heated in the presence of ethylene at a pressure of 50 atmospheres from room temperature (30° C.) at a rate of 2.7° per minute to a final temperature of 165° C. and held at the latter temperature for a total reaction period of 6 hours. The product in this run consisted predominantly of carbon mixed with fine needle-shaped white crystals. It was concluded that the heating rate again was excessive to obtain the desired condensation of the hexachlorocyclopentadiene with the ethylene reactant.

In the following experiment, 41 grams of hexachlorocyclopentadiene was heated in a pressure autoclave with ethylene at 50 atmospheres pressure from room temperature (30° C.) to 180° C. at a heating rate of 1.64° per minute, when the reaction mixture reached the latter temperature, it was maintained at this temperature for a period of approximately 5.5 hours, following which the autoclave was emptied and the liquid product therein was distilled as described below in the subsequent preparation of a larger quantity. A 74% yield of a crystalline product was obtained having a boiling point at 3 mm. of mercury absolute pressure of 111° C., its chlorine analysis indicating its composition to be $C_7H_4Cl_6$, corresponding to 1,2,3,4,7,7-hexachlorobicyclo[2.2.1]-2-heptene. The recrystallized product melted at 38° C.

In the following run, 300 grams of hexachlorocyclopentadiene was heated in a pressure autoclave with ethylene at a pressure of 45 atmospheres. In this experiment, the autoclave and its contents were heated to 100° C. during one hour and then to 210° C. during 6 hours, thereby providing a heating rate of approximately 0.33° C. per minute in the temperature range of from 100° to 210° C. The product which weighed 222 grams was charged into a vacuum distillation apparatus in which the product was distilled at approximately 3 mm. mercury absolute pressure. 9.5 cc. of liquid came over at a temperature range of from about 59° to about 107° C. at 3 mm. pressure, 13.2 cc. came over at 107–111° C., 156 grams of the product came over at 111° C., (the latter fraction crystallizing in the receiver) and 22 grams of crystalline material came over at 111 to 114° C. 5.5 grams of tar remained in the bottom of the distillation flask following the separation of the above fractions. The fraction boiling at 111° C. at 3 mm. pressure melted at 38° C. and analysis thereof for carbon, hydrogen and chlorine indicated the following results: C, 28.04%; H, 1.52%; Cl, 70.54% as compared to calculated values for $C_7H_4Cl_6$ of C, 27.95%; H, 1.34%; and Cl, 70.71%. A total yield of 91% of the material melting at 38° C. was obtained upon recrystallization of the above product.

*Example II*

A solution of 50 g. of 1-pentene and 100 g. of hexachlorocyclopentadiene in the glass liner of a rotating autoclave was heated under 30 atmospheres initial nitrogen pressure, the temperature being raised from room temperature to 200° C. during 6 hours and kept at 200° C. for 1 hour. The product was thereafter distilled from the reaction mixture at a subatmospheric pressure. There was obtained 90 g. (71% of the theoretical yield) of liquid product boiling at 149–150° C. at 8 mm. pressure, and having a refractive index, $n_D^{20}$, of 1.5365. Analysis of the compound indicated the following elemental composition: C, 35.15%; H, 3.31%; Cl, 61.50%. The values calculated for 1,2,3,4,7,7-hexachloro-5-propylbicyclo[2.2.1]-2-heptene or $C_{10}H_{10}Cl_6$ are as follows: C, 35.02%; H, 2.94%; Cl, 62.04%.

*Examle III*

A solution of 50 g. each of hexachlorocyclopentadiene and 1-decene was heated under reflux for twenty minutes, the temperature rising during this period from 165° to 200° C. Distillation of the product yielded 65 g. (86% of the theoretical yield) of the adduct: 1,2,3,4,7,7-hexachloro-5-hexylbicyclo[2.2.1]-2-heptene boiling at 184–186° C. at about 2.5 mm. pressure, and having a refractive index, $n_D^{20}$, of 1.5180.

The adduct was also prepared by reacting a mixture of 50 g. each of the hexachlorocyclopentadiene and the 1-decene at a pressure of 30 atmospheres initial nitrogen pressure, in a glass liner placed in a rotating autoclave (the apparatus used in Example II above). The autoclave and its contents was heated from 100° to 200° C. during 3.5 hours and kept at 200° C. for 1.5 hours. Removal of the unreacted decene and a small amount of hexachlorocyclopentadiene by distillation from the reaction mixture yielded 74 g. of a high-boiling residue consisting largely of the desired adduct.

I claim as my invention:

1. As a new compound, a 1,2,3,4,7,7-hexahalobicyclo-(2.2.1)-2-heptene, said compound being the Diels-Alder condensation product of a hexahalocyclopentadiene, in which the halogen substituents are selected from the group consisting of bromine and chlorine, with an aliphatic mono-olefinic hydrocarbon.

2. As a new compound, a 1,2,3,4,7,7-hexachlorobicyclo(2.2.1)-heptene, said compound being the Diels-Alder condensation product of hexachlorocyclopentadiene with an aliphatic mono-olefinic hydrocarbon.

3. 1,2,3,4,7,7 - hexachlorobicyclo(2.2.1) - 2 - heptene having a melting point of about 38° C. and being the Diels-Alder condensation product of hexachlorocyclopentadiene and ethylene.

4. As a new compound, a 1,2,3,4,7,7-hexahalobicyclo(2.2.1)-2-heptene, said compound being the Diels-Alder condensation product of a hexahalocyclopentadiene, in which the halogen substituents are selected from the group consisting of bromine and chlorine, with an aliphatic mono-olefinic hydrocarbon having less than six carbon atoms per molecule.

5. As a new compound, a 1,2,3,4,7,7-hexachlorobicyclo(2.2.1)-heptene, said compound being the Diels-Alder condensation product of hexachlorocyclopentadiene with an aliphatic mono-olefinic hydrocarbon having less than six carbon atoms per molecule.

References Cited in the file of this patent

UNITED STATES PATENTS

| | | |
|---|---|---|
| 2,340,908 | Thomas | Feb. 8, 1944 |
| 2,349,232 | Joshel | May 16, 1944 |
| 2,606,910 | Herzfeld et al. | Aug. 12, 1952 |
| 2,724,730 | Johnson | Nov. 22, 1955 |

FOREIGN PATENTS

| | | |
|---|---|---|
| 498,176 | Belgium | Oct. 14, 1950 |

OTHER REFERENCES

Riemschneider et al.: "Mitt. Physiolog. Chem. Inst.," Berlin R. 11 (8 p.), October 1947.

Meyers: "Derivatives of Hexachlorocyclopentadiene and 1,2,3,4-Tetrachlorocyclopentadiene," Purdue University, February, 1950 (p. 57 relied upon).

Rakoff: "Derivatives of Hexachlorocyclopentadiene," Purdue University, June 1950, (p. 22 relied upon).